United States Patent [19]

Gonzalez

[11] 4,359,111

[45] Nov. 16, 1982

[54] SELF COMPENSATING SEAL APPARATUS

[76] Inventor: Eduardo B. Gonzalez, Ave. Universidad Num. 482, Mexico 13, D.F., Mexico

[21] Appl. No.: 153,684

[22] Filed: May 27, 1980

[51] Int. Cl.³ .......................................... E21B 10/22
[52] U.S. Cl. ................................. 175/227; 175/372; 277/65; 277/85; 277/92
[58] Field of Search ........ 175/371, 372, 354, 227–229; 308/8, 2; 277/85–87, 175, 65, 81 R, 84, 92, 95

[56] References Cited

U.S. PATENT DOCUMENTS

| | | | |
|---|---|---|---|
| 2,747,902 | 5/1956 | Payne et al. | 277/65 |
| 3,299,973 | 1/1967 | Swart et al. | 175/371 |
| 3,427,051 | 2/1969 | White et al. | 277/177 X |
| 3,572,452 | 3/1971 | Winberg | 175/371 |
| 3,591,188 | 7/1971 | Eisner | 277/65 X |
| 4,154,312 | 5/1979 | Barnetche | 175/354 X |
| 4,172,502 | 10/1979 | Nederveen | 175/372 X |

Primary Examiner—Ernest R. Purser
Attorney, Agent, or Firm—Armstrong, Nikaido, Marmelstein & Kubovcik

[57] ABSTRACT

A self compensating seal apparatus is provided for forming a seal between two rotary members such as the body and cutting head of a rotary drill bit to seal the space between the members from an external environment. The seal apparatus comprises a first sealing device mounted in a first of the members and a second sealing device mounted in the second of the members, the first and second sealing devices being positioned opposite to and in contact with each other along a contact plane and forming a seal therebetween. A Belleville spring is fixedly mounted in the first member for producing a force on the first sealing device in a direction perpendicular to the contact plane such that the first sealing device is biased and held in contact with the second sealing device. A third sealing device seals the Belleville spring and the space between the first and second members from the external environment. The third sealing device includes an inclined plane portion on the first member and an annular elastic sealing member contacting the inclined plane portion and the first sealing device. It also includes an O-ring seal between the first member and the first sealing device. The third sealing device in combination with the first and second sealing devices, forms a floating seal which can move in response to wear of the faces of the first and second seal devices and tolerances and/or misalignment of the first and second members.

18 Claims, 2 Drawing Figures

SELF COMPENSATING SEAL APPARATUS

BACKGROUND OF THE INVENTION

1. Field of the Invention

The present invention is directed to an axial seal device and to an improvement in a rotary drill using an axial seal device and more particularly to an automatic wear compensating axial seal apparatus which uses a Belleville spring to bias two sealing members together. The biasing force of the Belleville spring is applied to one of the sealing members such that it is held in contact with the other sealing member and as wear occurs, on the contact faces of the sealing members, the Belleville spring exerts a force which continues to maintain contact between these surfaces. Furthermore, the present invention is more particularly directed to a rotary drill bit which incorporates the improvement of this type of an automatic wear compensating seal apparatus.

2. Description of the Prior Art

In prior art devices where it is necessary to provide a seal between two elements which move relative to one another, the most common types of seals are annular seals such as those shown in U.S. Pat. No. 4,154,312, which is directed to a Barnetche bit which is a rotary drill bit having a solid conical cutting head. The annular seals used in this reference are typical in that the annular sealing members are placed in grooves formed in one of the two members which are being sealed. The diameter of the annular sealing member is selected to be equal to the diameter of the groove so that the annular sealing member is not under any elastic force. The seal is formed by the peripheral surface of the annular sealing member which contacts the first member in the groove and the second member on the surface thereof. As a result of wear, the cross-sectional diameter of the seal will decrease and eventually the peripheral surface of the seal will not contact both the surface of the groove and the surface of the other element. At this point, the seal will lose its sealing effect.

Once the seal has lost its sealing effect and harmful elements in the environment in which the sealed device is operating can enter the interior of the device causing damage to other parts of the device. In a device such as the rotary drill bit shown in U.S. Pat. No. 4,154,312, that portion of the drill bit which wears first is the seals. In order to replace the seals, it is necessary to withdraw the drill bit from the bore hole, remove the cutting head, add new seals, replace the cutting head and then place the drill bit down the bore hole again. This is a time consuming task and, therefore, the change of seals is a costly operation as a result of the lost time. Furthermore, failure to change the seals can cause serious damage to the internal elements of the drill bit.

Another type of prior art seal is a helical spring or bellows seal. This type of seal provides wear compensation since the sealing surfaces are perpendicular to the axis of the helical spring or bellows and the helical spring or bellows are compressed in order to bias the seal surfaces together. Although this type of seal provides compensation for wear, the sealing devices are complicated and costly and furthermore, have several disadvantages. First, they require a large amount of longitudinal space. The longitudinal space occupied by the seal is significant because the nozzle of the drill bit should be as low as possible. Further, the bellows are constructed of a thin metal convolution which cannot withstand the agressive environment found in drilling.

Still another type of seal found in drill bits is one in which an elastic annular member is positioned between a drill bit and cutting head with the annular member forming a seal against an inclined plane. This type of seal is shown in U.S. Pat. No. 3,299,973. Seals of this type will not, however, withstand the extreme conditions often found downhole in the drilling of wells and the seal will be subject to leakage under the extreme pressures and to damage caused by the rotation of the cutting head with respect to the drill bit and the destructive materials found in a downhole environment.

SUMMARY OF THE INVENTION

It is the primary object of the present invention to provide a seal device which has automatic wear compensation.

It is another object of the present invention to provide an automatic wear compensating seal device to form a seal between two rotating members wherein the sealing faces are formed of a hardened material.

It is a further object of the present invention to provide an automatic wear compensating seal device in which the seal faces are biased towards one another and in which a relatively large bias force is maintained using a relatively small amount of space.

It is still another object of the present invention to provide an automatic wear compensating seal device which can withstand the extreme conditions of a downhole environment and which occupies a relatively small amount of space.

It is still a further object of the present invention to provide a rotary drill which includes an automatic self compensating sealing apparatus incorporating the above objects.

The present invention is directed to a sealing device for forming a seal between first and second surfaces which rotate with respect to one another. The sealing device comprises a first seal means mounted in the first surface and a second seal means mounted in the second surface. A Belleville spring biasing means biases the first seal means in contact with the second seal means and a coupling means couples the Belleville spring biasing means to the first seal means. A third seal means seals the Belleville spring biasing means and other internal components from an external environment and maintains the internal pressure.

It is a further feature of the present invention to provide a sealing device in which the third seal means comprises an inclined plane portion of the first surface and an elastic annular seal member positioned between and in contact with the inclined plane portion and the coupling means which functions as a mud seal. The third seal means further includes an O-ring seal which is positioned between and in contact with the first surface and the coupling means which functions as an internal pressure seal.

It is another feature of the present invention to provide means for preventing the rotation of the first seal means with respect to the first surface.

It is still a further feature of the present invention to incorporate the above structure as an improvement in a rotary drill for drilling a well in the surface of the earth.

DETAILED DESCRIPTION OF THE PREFERRED EMBODIMENT

Figure 1:
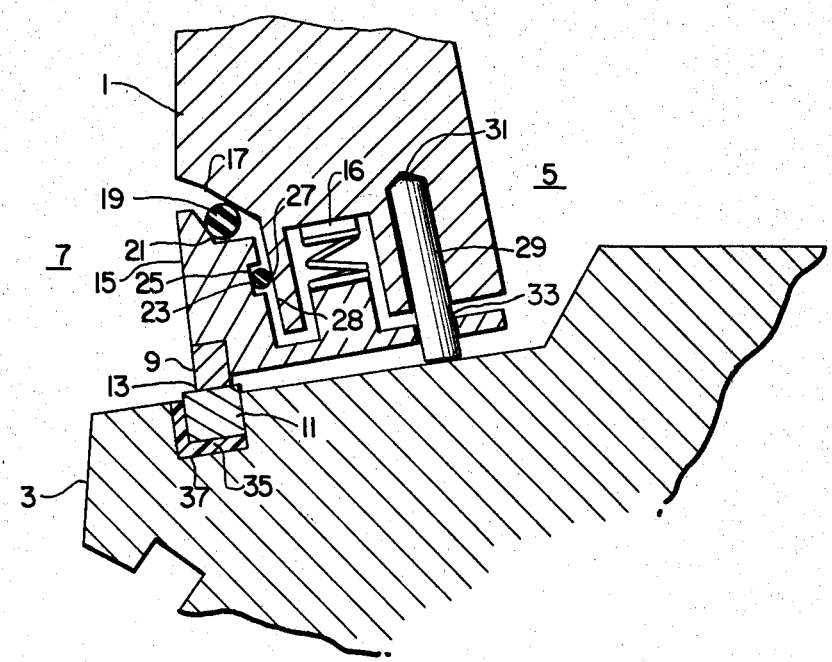
FIG. 1 is a cross-sectional view showing a sealing device of the present invention.

Referring to the drawings, the rotary drill comprises a drill bit or body 1 and a cutting head 3 which rotates relative to the drill bit 1. The interior space 5 within the drill bit is sealed from the external environment 7 by means of the sealing device or apparatus of the present invention. The seal is formed by two sealing members 9 and 11 made of a hardened material such as silicon carbide or tungsten carbide, these members forming a seal along plane 13.

A coupling member 15 couples the sealing member 9 to a Belleville spring 16 which provides a bias force which holds the sealing member 9 against sealing member 11. The Belleville spring 16 is positioned radially inward with respect to the sealing members 9 and 11 and the force of the Belleville spring is transmitted to the sealing member 9 through the coupling member 15. The Belleville spring is positioned radially inward with respect to the seal member 9.

In order to protect the Belleville spring 16 and other internal components from the external environment which is a very agressive environment in a bore hole, a sealing structure is provided. This sealing structure includes an inclined plane or surface 17 on the drill bit body 1 and an annular elastic member member 19 which is positioned between and in contact with the inclined plane 17 and the coupling member 15. Because of the elastic nature of the annular seal member 19, it has a reaction force with the inclined plane 17. The reaction force has a vertical component which will maintain the annular member in contact with surface 21 of the coupling member 15 and a horizontal or radially inward component which will maintain contact between the annular member and the surface 17. Furthermore, the annular member 19 will move up and down the inclined plane 17 in response to relative vertical movement between the drill bit body 1 and the cutting head 3. The seal for protecting the Belleville spring 16 also includes an O-ring 23 positioned in notch 25 in the coupling member 15. The O-ring forms a seal with the drill bit body at 27. The O-ring also moves vertically along surface 28 in response to relative vertical movement between the drill bit body 1 and the cutting head 3. This seal arrangement in combination with the Belleville spring and first and second seal members forms a floating seal structure which automatically compensates for wear and for deflection and/or misalignment of the cutting head.

In order to prevent wear of the seals 19 and 23 and to prevent wear between the Belleville spring 16 and drill bit body 1 and coupling member 15, it is necessary to prevent the rotation of the coupling member 15 with respect to the drill bit body 1. A pin 29 is inserted into a hole 31 in the drill bit body 1 with the pin 29 passing through a hole 33 in the coupling member 15. The pin 29 will prevent rotation of the coupling member 15 and the elements associated with it with respect to the drill body 1. The coupling member 15 is movable with respect to the pin 29 to allow for the floating of the seal structure.

In order to compensate for tolerances, misalignment, etc. an elastic member 35 is positioned within a groove 37 in the cutting head 3. The sealing member 11 is mounted on the elastic member 35 in the groove 37. The elastic member 35 will permit larger tolerances and allow for possible misalignment, etc.

Figure 2:
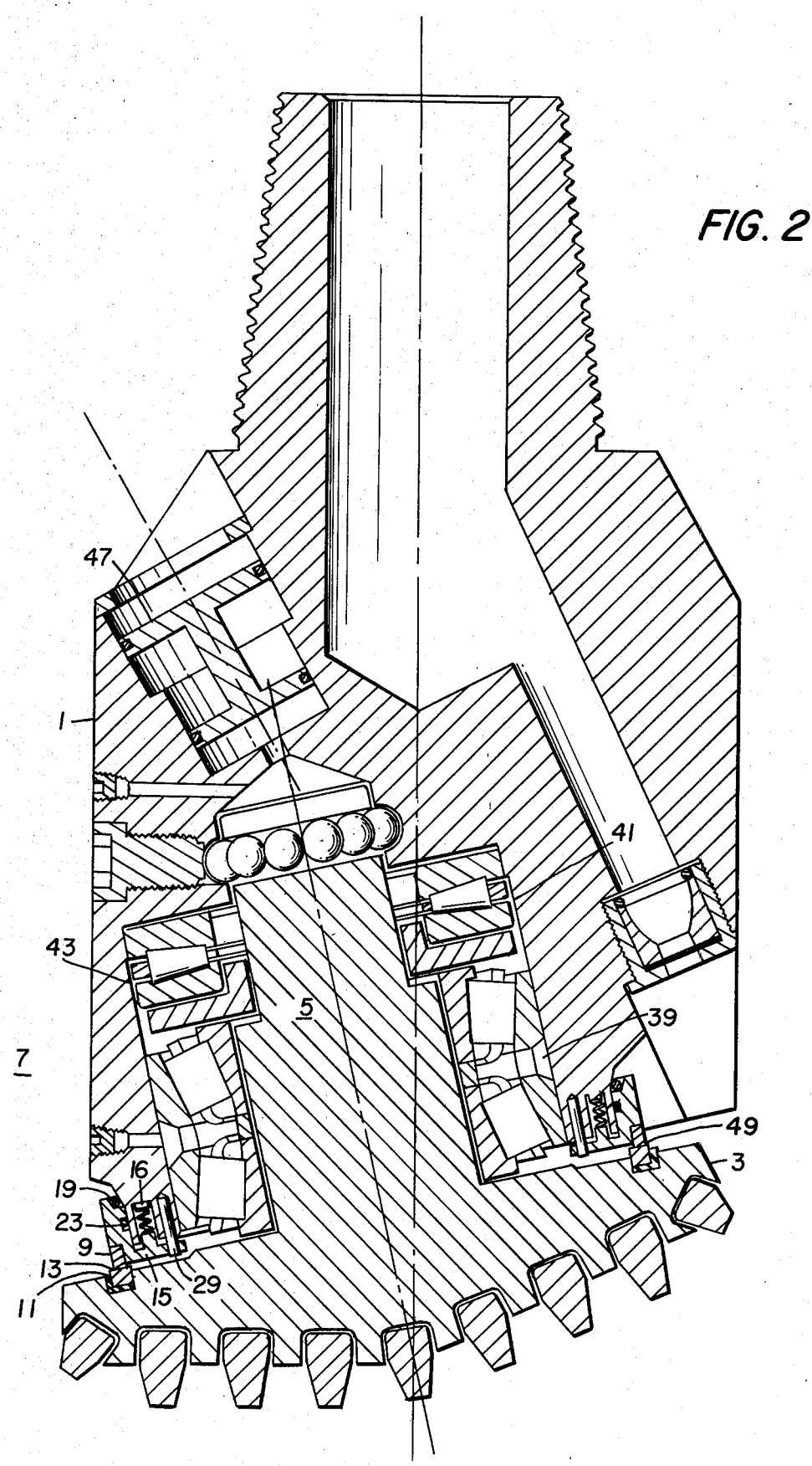
FIG. 2 is a cross-sectional view of a rotary drill bit incorporating the sealing device of the present invention.

FIG. 2 illustrates a rotary drill bit which incorporates an automatic wear compensating sealing device of the present invention. The rotary bit is a Barnetche bit which is disclosed in U.S. Pat. No. 4,154,312, this patent being incorporated herein by reference. The drill bit body 1 has a solid conical head 3 rotatably mounted therein. The cutting head 3 is supported by bearings 39, 41, 43 and 45. Pressure compensation within the lubrication system for the bearings and the conical head is provided by means of a pressure compensator 47. The interior volume or space within the upper portion of the body 1 is sealed from the external environment by means of the sealing device of the present invention generally indicated at 49. The sealing device is of the type shown in FIG. 1 which has been discussed in detail above.

The pressure compensator 47 can be of the type shown and described in my copending application Ser. No. 60,056. This type of pressure compensator will produce a greater pressure in the interior or receiving means of the housing 1 than the pressure on the exterior of the drill bit. This will cause the lubricant within the interior space 5 which lubricates the bearings to flow in a direction through the seal towards the exterior of the drill bit thus lubricating the sealing devices and thereby enhancing their useful life.

As the cutting head 3 rotates with respect to the drill bit body 1, there is contact between sealing members 9 and 11 in plane 13. The rotation thus causes a wearing of the contacting surfaces of the sealing members 9 and 11. As the contacting surfaces wear, the force of the Belleville spring 16 continues to maintain contact between sealing members 9 and 11 because the force of the Belleville spring is perpendicular to the plane 13. Thus, the sealing device is automatically self compensating as a result of the use of the Belleville spring which maintains a constant biasing force.

In a rotary drill bit the face seal formed between seal members 9 and 11 generally must withstand a pressure differential of 50–100 psi. The Belleville spring applies a sufficient force to the seal members to withstand this pressure and thus maintain the face seal. Furthermore, the seal faces can be formed from a very hard material which will reduce wear and in the event there is a small leakage of material from within the bore hole into the seal face the material will be ground so finely that its effect on internal components is minimized.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A sealing device for forming a seal along the periphery between first and second surfaces which surround an internal space, said sealing device comprising:
   (a) a first closed seal means mounted in said first surface surrounding the periphery of said internal space;

(b) a second closed seal means mounted in said second surface surrounding the periphery of said internal space;

(c) spring biasing means for biasing said first seal means in contact with said second seal means to form a seal therebetween around the periphery of said internal space, wherein (the) said spring biasing means is displaced (radially) inward with respect to said first and second closed seal means in said internal space;

(d) coupling means for coupling said spring biasing means to said first seal means; and (e) third seal means for sealing said spring biasing means from an external environment.

2. A sealing device as set forth in claim 1, wherein said spring biasing means is a Belleville spring.

3. A sealing device as set forth in claims 1 or 2, wherein said third seal means comprises:

(a) an inclined plane portion of said first surface and an elastic annular seal member positioned between and in contact with an inclined plane portion and said coupling means; and (b) an O-ring seal positioned between and in contact with said first surface and said coupling means, wherein said annular seal member seals said O-ring seal from the environment and said O-ring seal maintains the pressure on the side of the sealing device opposite to the environment.

4. A sealing device as set forth in claim 1, wherein said second sealing means comprises:

(a) a groove in said second surface;

(b) an elastic means fitted into said groove; and (c) a hard seal member supported in said groove by said elastic means.

5. A self compensating seal apparatus for forming a seal between two rotary members to seal the space between said members from an external environment, said seal apparatus comprising:

(a) a first closed sealing means mounted in a first of said members along the periphery thereof;

(b) a second closed sealing means mounted in a second of said members along the periphery thereof, said first and second sealing means being positioned opposite to and in contact with one another along a contact plane and forming a seal therebetween around the periphery of the space between said members;

(c) spring biasing means, fixedly mounted in said first member, for producing a force on said first sealing means in a direction perpendicular to the contact plane such that said first sealing means is held in contact with said second sealing means, wherein said spring biasing means is displaced (radially) inwardly with respect to said first and second sealing means in the space between said members; and (d) third sealing means for sealing said spring biasing means and said space from the external environment.

6. A self compensating seal apparatus as set forth in claim 5, wherein said first sealing means comprises:

(a) a first sealing member in contact with said second sealing means; and (b) a transmitting means in contact with said first sealing member and said spring biasing means for transmitting the force of said spring biasing means to said first sealing member.

7. A self compensating seal apparatus as set forth in claim 6, wherein said first sealing means includes means for preventing the rotation of said first sealing means relative to said first member.

8. A self compensating seal apparatus as set forth in claim 7, wherein said means for preventing rotation comprises a pin means mounted in said first member and passing through said transmitting means.

9. A self compensating seal apparatus as set forth in claim 5, wherein said second sealing means comprises:

(a) a second sealing member contacting said first sealing means; and (b) elasticly deformable means positioned between said second sealing member and said second member.

10. A self compensating seal apparatus as set forth in any of claims 5-9, wherein said third sealing means comprises:

(a) an inclined plane portion on said first member; and (b) an annular elastic sealing member contacting said first sealing means and said inclined plane portion of said first member for forming a seal therebetween.

11. A self compensating seal apparatus as set forth in claim 10, wherein said third sealing means includes an O-ring seal between said first member and said first sealing means.

12. A self compensating seal apparatus as set forth in claim 5, wherein said spring biasing means comprises a Belleville spring.

13. In a rotary drill for drilling a well in the surface of the earth, said drill comprising:

(a) a drill bit including an upper portion for connection to a drill string, duct means including a fluid outlet into the well for carrying fluid to extract detritus and clean the bottom of the well and receiving means;

(b) a cutting head comprising a conical head portion and a unitary stem portion, said conical head portion including holes therein and cutting elements inserted in said holes, said stem portion being received in said receiving means of said drill bit, wherein said stem and said receiving means include holding means for rotatably holding said cutting head in said drill bit;

(c) bearing means between said drill bit and said conical head;

(d) a lubrication system interconnected between said drill bit and said cutting head; and (e) a seal device between said upper portion and said cutting head;

the improvement wherein said seal device is an automatic wear compensating seal device comprising:

(f) a first closed seal means mounted in said drill bit along the periphery thereof;

(g) a second closed seal means mounted in said cutting head along the periphery thereof, said first and second seal means being positioned opposite to and in contact with one another along a contact plane and forming a seal therebetween, for sealing the internal space within said drill bit along the periphery thereof;

(h) spring biasing means for biasing said first sealing means in a direction perpendicular to the contact plane to maintain the contact between said first and second seal means, wherein said spring biasing means is positioned inwardly with respect to said first and second seal means in said internal space;

(i) coupling means for coupling said spring biasing means to said first sealing means and for transmitting the biasing force of said spring biasing means to said first sealing means; and (j) third seal means for sealing said spring biasing means from an external environment.

14. A rotary drill as set forth in claim 13, wherein said spring biasing means is a Belleville spring.

15. A rotary drill as set forth in any of claims 13 or 14, wherein said third seal means comprises:
(a) an inclined plane portion on said drill bit and an elastic annular seal member positioned between and in contact with said inclined plane portion and said coupling means; and
(b) an O-ring seal means positioned between and in contact with said drill bit and said coupling means, wherein said annular seal member seals said O-ring seal means from the environment and said O-ring seal means maintains the internal pressure within said drill bit.

16. A rotary drill as set forth in any of claims 13 or 14, wherein said second seal means comprises:
(a) a groove in said cutting head;
(b) an elastic supporting means fitted into said groove; and
(c) a hard seal member supported in said groove by said elastic means.

17. A drill bit as set forth in claim 13, wherein said coupling means includes means to prevent the rotation of said first seal means with respect to said drill bit.

18. A drill bit as set forth in claim 17, wherein said rotation preventing means comprises a pin means projecting into said drill bit through said coupling means.

* * * * *